(12) United States Patent
Zhao et al.

(10) Patent No.: US 9,191,986 B2
(45) Date of Patent: Nov. 17, 2015

(54) TUNNEL REDIRECTION METHOD AND INTERWORKING FUNCTION ENTITY

(71) Applicant: Huawei Technologies Co., LTD, Shenzhen (CN)

(72) Inventors: Jie Zhao, Shenzhen (CN); Gongyi Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 143 days.

(21) Appl. No.: 13/907,634

(22) Filed: May 31, 2013

(65) Prior Publication Data

US 2013/0258983 A1    Oct. 3, 2013

Related U.S. Application Data

(63) Continuation of application No. PCT/CN2011/083119, filed on Nov. 29, 2011.

(30) Foreign Application Priority Data

Dec. 1, 2010    (CN) .......................... 2010 1 0577200

(51) Int. Cl.
*H04W 76/04*    (2009.01)
*H04W 92/02*    (2009.01)

(52) U.S. Cl.
CPC ............ *H04W 76/041* (2013.01); *H04W 92/02* (2013.01)

(58) Field of Classification Search
CPC . H04W 36/0022; H04W 76/02; H04W 76/06; H04W 84/045; H04W 92/02
See application file for complete search history.

(56) References Cited

U.S. PATENT DOCUMENTS

| | | | |
|---|---|---|---|
| 2002/0041597 A1* | 4/2002 | Maansaari et al. ........ | 370/395.61 |
| 2006/0159121 A1* | 7/2006 | Sakata et al. .................. | 370/466 |
| 2010/0046473 A1 | 2/2010 | Kozakai et al. | |
| 2010/0056147 A1* | 3/2010 | Sun et al. .................... | 455/435.2 |
| 2010/0135206 A1 | 6/2010 | Cherian et al. | |
| 2010/0317378 A1* | 12/2010 | Fang et al. ..................... | 455/466 |
| 2011/0009120 A1* | 1/2011 | You et al. ...................... | 455/436 |

(Continued)

FOREIGN PATENT DOCUMENTS

| | | |
|---|---|---|
| CN | 101389131 A | 3/2009 |
| CN | 101835134 A | 9/2010 |
| CN | 101848443 A | 9/2010 |

(Continued)

OTHER PUBLICATIONS

Alcatel-Lucent, Discussion on EPS bearer deactivation, R2-093083, 3GPP TSG WG2 Meeting #66, San Francisco, USA, May 4-8, 2009, pp. 1-3.*

(Continued)

*Primary Examiner* — Benjamin Lamont
(74) *Attorney, Agent, or Firm* — Slater & Matsil, L.L.P.

(57) ABSTRACT

A tunnel redirection method and an interworking function entity are disclosed. An IWS corresponding to an original tunnel receives a tunnel redirection notification sent by an IWS corresponding to a new tunnel or an MME. A currently-performed signaling interaction is terminated according to the notification. The IWS corresponding to the new tunnel or the MME sends a tunnel redirection notification to the IWS corresponding to the original tunnel. The IWS corresponding to the original tunnel terminates the currently-performed signaling interaction.

13 Claims, 9 Drawing Sheets

(56) References Cited

U.S. PATENT DOCUMENTS

2011/0014919 A1* 1/2011 Otte et al. ............... 455/442
2011/0176512 A1* 7/2011 Sun ........................ 370/331

FOREIGN PATENT DOCUMENTS

CN 101854685 A 10/2010
JP 201050892 A 3/2010

OTHER PUBLICATIONS

Nokia Siemens, et al., Enhanced CS Fallback to 1xRTT with PS Handover, Change Request, S2-094550, 3GPP TSG-SA WG2 Meeting #74, Sophia Antipolis, France, Jul. 6-10, 2009, pp. 1-20.*
Change Request, "S102 Redirection," 3GPP TSG CT WG4 Meeting #41, C4-083272, Shanghai, PR China, Nov. 9-14, 2008, 3 pages.
International Search Report and Written Opinion for Application No. PCT/CN2011/083119, mailed Mar. 8, 2012, 9 pages.
Change Request, "Correction in B.2.1.2 and B2.3," 3GPP TSG-SA WG2 Meeting #73, S2-093940, Tallin, Estonia, May 11-15, 2009, 5 pages.
3rd Generation Partnership Project; Technical Specification Group Services and System Aspects; Circuit Switched (CS) fallback in Evolved Packet System (EPS) Stage 2 (Release 10), 3GPP TS 23.272, V10.1.0, Sep. 2010, 19 pages.
Notice of Reasons for Rejection of Chinese Application No. 2013-541195 mailed May 20, 2014, 5 pages.
3rd Generation Partnership Project; Technical Specification Group Core Network and Terminals; Optimized Handover Procedures and Protocol between EUTRAN access and non-3GPP accesses (S102); Stage 3 (Release 9), 3GPP TS 29.277 V9.2.0, Jun. 2010, 10 pages.
Chinese Office Action received in Application No. 201010577200.5 mailed Mar. 14, 2014, 15 pages.

* cited by examiner

TUNNEL REDIRECTION METHOD AND INTERWORKING FUNCTION ENTITY

CROSS-REFERENCE TO RELATED APPLICATIONS

This application is a continuation of International Application No. PCT/CN2011/083119, filed on Nov. 29, 2011, which claims priority to Chinese Patent Application No. 201010577200.5, filed on Dec. 1, 2010, both of which are hereby incorporated by reference in their entireties.

TECHNICAL FIELD

The present invention relates to the communications field, and in particular, to a tunnel redirection method and an interworking function entity.

BACKGROUND

To meet challenges of wireless broadband technologies and make full use of existing network resources, CDMA (Code Division Multiple Access) 1× operators will use an LTE (Long Term Evolution) network to provide users with data services, use a CDMA 1× network to provide users with voice services, and provide interworking between an LTE network entity and a CDMA 1× network entity by using a 1×CS (1× Circuit Switched) IWS (Interworking Solution) function entity designed for coupling between the LTE network entity and the CDMA 1× network entity. For ease of description, the 1×CS IWS is hereinafter referred to as an IWS.

For example, a UE (User Equipment) that camps on an LTE network sends 1× signaling destined for the 1× network to an MME (Mobility Management Entity), and then the MME forwards the 1× signaling to the corresponding IWS through an S102 tunnel established with the IWS. If the current eNB (evolved NodeB) serving the UE changes, the S102 tunnel needs to be reestablished, that is, the tunnel is redirected. When handling tunnel redirection in the prior art, the MME reselects the corresponding IWS, and sends the 1× signaling, which is sent by the UE, to the reselected IWS through a new tunnel after the new S102 tunnel is established with the IWS.

In the process of implementing the present invention, the inventor finds that the prior art has at least the following disadvantages:

Before the tunnel redirection, the IWS corresponding to the original tunnel is not sure whether the tunnel has been redirected, and therefore still performs signaling interaction, which leads to waste of system resources. In addition, after the current eNB serving the UE changes, all the 1× signaling sent by the UE will be sent by the MME to the reselected IWS through a new tunnel. At this time, if the UE is performing signaling interaction with the IWS corresponding to the original tunnel, the IWS corresponding to the original tunnel will be unable to receive the 1× signaling sent by the UE, and therefore the signaling interaction will be interrupted.

SUMMARY OF THE INVENTION

To avoid resource waste or signaling interaction interruption after tunnel redirection, embodiments of the present invention provide a tunnel redirection method and an interworking function entity. The technical solutions are as follows.

In one aspect, a tunnel redirection method is provided, where the method includes receiving, by an interworking function entity IWS corresponding to an original tunnel, a tunnel redirection notification sent by an IWS corresponding to a new tunnel or a mobility management entity MME, sending a signaling forwarding indication to the IWS corresponding to the new tunnel or the MME according to the notification, and receiving signaling forwarded by the IWS corresponding to the new tunnel or the MME according to the signaling forwarding indication.

An interworking function entity is also provided, where the entity includes a first receiving module, configured to receive a tunnel redirection notification sent by an interworking function entity IWS corresponding to a new tunnel or a mobility management entity MME, a sending module, configured to send a signaling forwarding indication to the IWS corresponding to the new tunnel or the MME according to the notification received by the first receiving module, and a second receiving module, configured to receive signaling forwarded by the IWS corresponding to the new tunnel or the MME according to the signaling forwarding indication sent by the sending module.

In another aspect, a tunnel redirection method is provided, where the method includes receiving, by an interworking function entity IWS corresponding to an original tunnel, a tunnel redirection notification sent by an IWS corresponding to a new tunnel or a mobility management entity MME, and terminating currently-performed signaling interaction according to the notification.

An interworking function entity is also provided, where the entity includes a receiving module, configured to receive a tunnel redirection notification sent by an interworking function entity IWS corresponding to a new tunnel or a mobility management entity MME, and a processing module, configured to terminate currently-performed signaling interaction according to the notification received by the receiving module.

The technical solutions provided in the embodiments of the present invention bring the following benefits.

After tunnel redirection, an IWS corresponding to a new tunnel or an MME sends a tunnel redirection notification to an IWS corresponding to an original tunnel, and therefore, the IWS corresponding to the original tunnel terminates the currently-performed signaling interaction, thereby avoiding resource waste after the tunnel redirection; in addition, after receiving the tunnel redirection notification, the IWS corresponding to the original tunnel sends a signaling forwarding indication to the IWS corresponding to the new tunnel or the MME, and therefore, the IWS corresponding to the new tunnel or the MME forwards the received signaling to the IWS corresponding to the original tunnel, thereby preventing interruption of signaling interaction after the tunnel redirection.

BRIEF DESCRIPTION OF THE DRAWINGS

To describe the technical solutions in the embodiments of the present invention more clearly, the following briefly introduces the accompanying drawing required for describing the embodiments of the present invention. Apparently, the accompanying drawings in the following description show merely some embodiments of the present invention, and persons of ordinary skill in the art may still derive other drawings from the accompanying drawings without creative efforts.

DETAILED DESCRIPTION OF ILLUSTRATIVE EMBODIMENTS

To make the objectives, technical solutions, and advantages of the present invention clearer, the following describes the embodiments of the present invention in detail with reference to the accompanying drawings.

Figure 1:
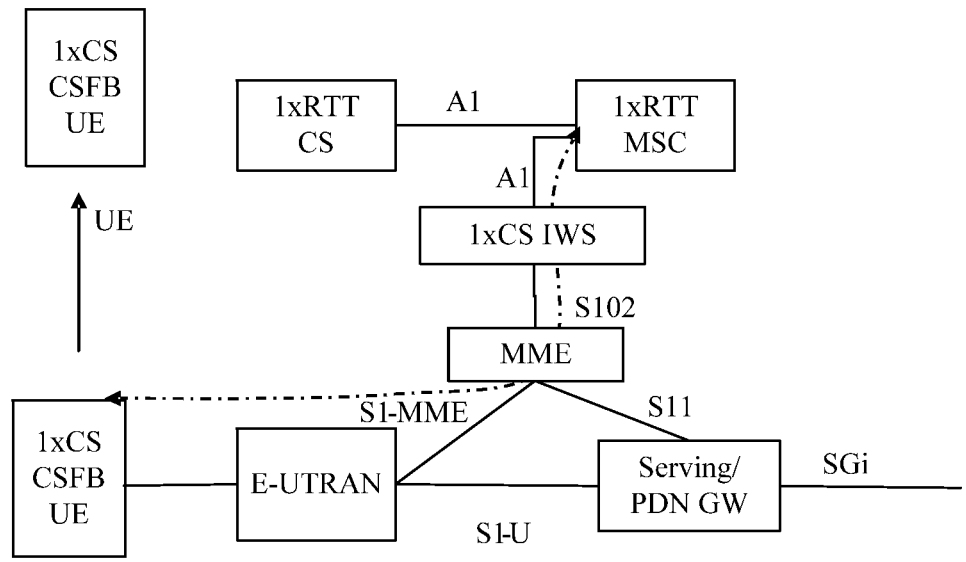
FIG. 1 is a schematic diagram of a circuit switched fallback networking structure according to Embodiment 1 of the present invention.

First embodiment, reference is made to the schematic diagram of a circuit switched fallback networking structure shown in FIG. 1. When a UE is located in a coverage area of an LTE network, the UE camps on the LTE network and no longer monitors CDMA signals. At this time, if the UE needs to use a voice service in a CDMA 1× network, the UE needs to fall back to the CDMA 1× network from the LTE network. As shown in FIG. 1, when camping on the LTE network, a UE capable of CSFB (CS FallBack) may perform pre-registration in the 1× circuit switched domain through the S102 tunnel, so as to use the 1× network in the CS domain to establish a voice call. At this time, the signaling sent by the UE to the 1×RTT (1× Radio Transmission Technology) MSC (Mobile switching Center) passes through the E-UTRAN (Evolved UMTS Terrestrial Radio Access Network), the MME, and the 1×CS IWS in sequence to arrive at the 1×RTT MSC; and the signaling sent by the 1×RTT MSC to the UE travels a reverse path. The path for signaling interaction between the UE and the 1×RTT MSC is shown by the dotted line in FIG. 1. The S102 interface provides a tunnel between the MME and the 3GPP2 ($3^{rd}$ Generation Partnership Project 2) 1×CS IWS to forward 3GPP2 1×CS signaling messages. S11 is an interface between the MME and a Serving GW (Serving Gateway) or PDN GW (Packet Data Network Gateway), and S1-U is an interface between the E-UTRAN and the Serving GW/PDN GW, and S1-MME is an interface between the E-UTRAN and the MME.

Figure 2:
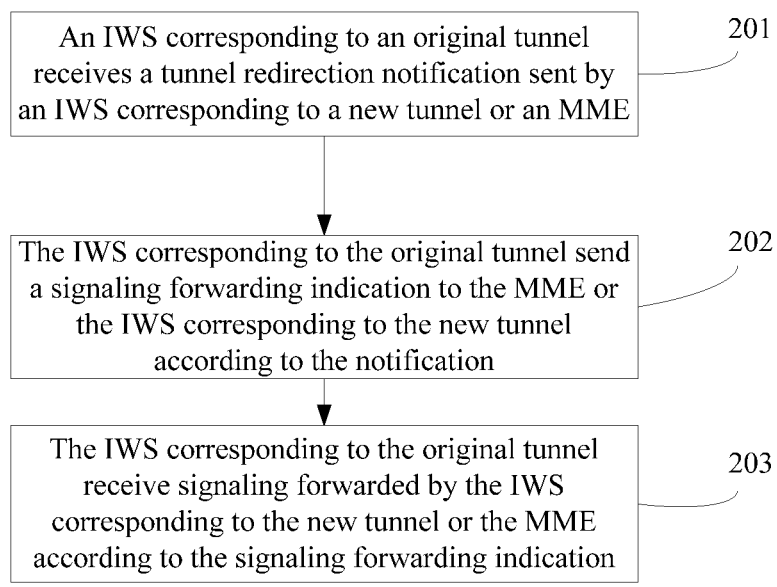
FIG. 2 is a flowchart of a tunnel redirection method according to Embodiment 1 of the present invention.

Corresponding to the circuit switched fallback networking structure shown in FIG. 1, the embodiment provides a tunnel redirection method. The method deals with how to redirect a tunnel in a scenario in which an IWS corresponding to an original tunnel still requires signaling interaction after tunnel redirection. Specifically, as shown in FIG. 2, the process of the method can include the following steps.

201: An IWS corresponding to an original tunnel receives a tunnel redirection notification sent by an IWS corresponding to a new tunnel or an MME.

202: The IWS corresponding to the original tunnel sends a signaling forwarding indication to the IWS corresponding to the new tunnel or the MME according to the notification.

203: The IWS corresponding to the original tunnel receives signaling forwarded by the IWS corresponding to the new tunnel or the MME according to the signaling forwarding indication.

In this embodiment and subsequent embodiments, a tunnel used before tunnel redirection is called an original tunnel, and a tunnel established after tunnel redirection is called a new tunnel.

Further, the receiving signaling forwarded by the IWS corresponding to the new tunnel or the MME according to the signaling forwarding indication specifically includes receiving the signaling forwarded by the IWS corresponding to the new tunnel or the MME until a signaling forwarding stop indication is returned to the IWS corresponding to the new tunnel or the MME, where the indication instructs the IWS corresponding to the new tunnel or the MME to stop forwarding signaling.

Alternatively, the receiving signaling forwarded by the IWS corresponding to the new tunnel or the MME according to the signaling forwarding indication specifically includes receiving the signaling forwarded by the IWS corresponding to the new tunnel or the MME within a preset time period, and stopping, by the MME or the IWS corresponding to the new tunnel, forwarding signaling after the preset time period.

The preset time period is preset or temporarily negotiated between the IWS corresponding to the original tunnel and the IWS corresponding to the new tunnel or the MME.

Preferably, after the IWS corresponding to the new tunnel or the MME stops forwarding signaling, the IWS corresponding to the original tunnel releases resources of the original tunnel.

Specifically, the receiving, by the IWS corresponding to the original tunnel, a tunnel redirection notification sent by the MME, includes receiving, by the IWS corresponding to the original tunnel, the tunnel redirection notification sent by the MME, where the notification is sent after the MME determines that a tunnel needs to be redirected.

Alternatively, the receiving, by the IWS corresponding to the original tunnel, a tunnel redirection notification sent by the IWS corresponding to the new tunnel, includes receiving, by the IWS corresponding to the original tunnel, the tunnel redirection notification that is sent, according to an identifier of the IWS corresponding to the original tunnel, by the IWS corresponding to the new tunnel, where the identifier of the IWS corresponding to the original tunnel is sent by the MME to the IWS corresponding to the new tunnel after the MME determines that a tunnel needs to be redirected.

With the method provided in the embodiment, after tunnel redirection, an IWS corresponding to a new tunnel or an MME sends a tunnel redirection notification to an IWS corresponding to an original tunnel, and therefore, the IWS corresponding to the original tunnel sends a signaling forwarding indication to the IWS corresponding to the new tunnel or the MME after receiving the tunnel redirection notification, where the signaling forwarding indication instructs the IWS corresponding to the new tunnel or the MME to forward received signaling to the IWS corresponding to the original tunnel, thereby preventing interruption of signaling interaction after the tunnel redirection.

This second embodiment provides a tunnel redirection method. In practical networking, a 1×CS IWS serves an area, and an MME selects a proper 1×CS IWS according to a reference cell identifier parameter Reference Cell ID configured by an eNB. On the MME, each Reference Cell ID is mapped to a corresponding IWS. On the basis of Embodiment 1, this embodiment describes the tunnel redirection method in detail with reference to the schematic diagram of the tunnel redirection shown in FIG. 3.

Figure 3:
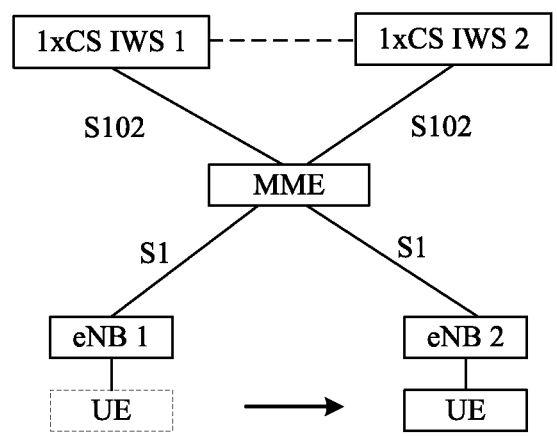
FIG. 3 is a schematic diagram of tunnel redirection according to Embodiment 2 of the present invention.
Figure 4:
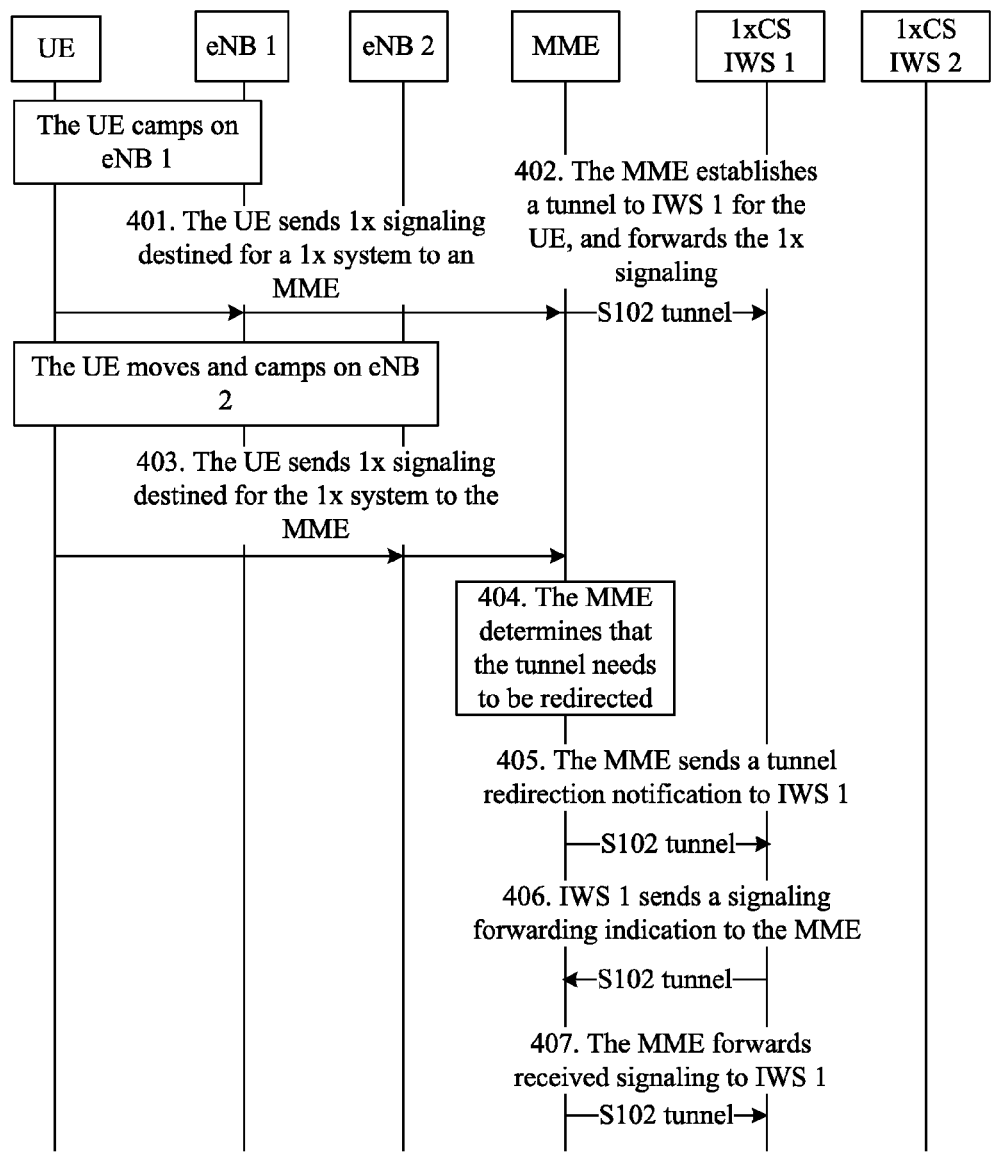
FIG. 4 is a flowchart of a tunnel redirection method according to Embodiment 2 of the present invention.

In FIG. 3, an S1 connection exists between eNB 1 and the MME, and between eNB 2 and the MME. It is assumed that Reference Cell ID 1 is configured by eNB 1 and mapped to 1×CS IWS 1, and that Reference Cell ID 2 is configured by eNB 2 and mapped to 1×CS IWS 2. For a scenario in which signaling interaction is still required between 1×CS IWS 1 and a UE after 1×CS IWS 1 receives a tunnel redirection notification, this embodiment discloses a solution. Specifically, as shown in FIG. 4, the process of the method provided in this embodiment can include the following steps.

401: The UE that camps on eNB 1 sends 1× signaling destined for a 1× system to the MME.

402: According to a reference cell identifier configured by eNB 1, the MME establishes an S102 tunnel to IWS 1 for the UE, and forwards the 1× signaling, which is sent by the UE, to IWS 1.

403: After moving and camping on eNB 2, the UE sends 1× signaling destined for the 1× system to the MME.

404: According to the reference cell identifier configured by eNB 2, the MME determines that the tunnel needs to be redirected.

405: The MME sends a tunnel redirection notification to IWS 1.

406: IWS 1 sends a signaling forwarding indication to the MME after receiving the tunnel redirection notification.

For this step, IWS 1 at this time is an entity corresponding to the original tunnel, and the MME may be regarded as an entity corresponding to the new tunnel. After receiving the tunnel redirection notification, IWS 1 determines that signaling interaction with the UE is still required, and therefore, sends a signaling forwarding indication to the MME, that is, forces the MME to forward the signaling, which is sent by the UE, to IWS 1, thereby preventing interruption of signaling interaction. This embodiment does not restrict how IWS 1 sends the signaling forwarding indication to the MME. For example, IWS 1 may use a dedicated message to send the signaling forwarding indication, or use a new flag bit added in an existing message to carry the signaling forwarding indication.

407: The MME forwards received signaling to IWS 1 according to the signaling forwarding indication.

Specifically, because the MME has received the signaling forwarding indication sent by IWS 1, the MME still forwards the 1× signaling, which is sent by the UE, to IWS 1 even if the MME determines that the tunnel needs to be redirected.

This embodiment does not restrict how the MME forwards the signaling. In practical applications, after receiving signaling forwarded by the MME, IWS 1 may send a signaling forwarding stop indication to the MME so that the MME stops forwarding. Therefore, the MME forwards the received signaling to IWS 1 according to the signaling forwarding indication until a signaling forwarding stop indication is received from IWS 1.

Alternatively, the MME may forward the received signaling to an entity corresponding to the original tunnel within a preset time period according to the signaling forwarding indication, and stop forwarding signaling after the preset time period. The preset time period may be preset or temporarily negotiated between IWS 1 and the MME. This embodiment does not restrict the value of the preset time period.

With the method provided in this embodiment, no matter how the MME is triggered to stop forwarding signaling, in order to save resources, after the MME stops forwarding signaling, the MME redirects the tunnel to IWS 2, and all 1× signaling related to the UE will be transmitted through the new tunnel subsequently, and IWS 1 may release resources of the original tunnel.

With the method provided in the embodiment, after tunnel redirection, an MME sends a tunnel redirection notification to an IWS corresponding to an original tunnel, and therefore, the IWS corresponding to the original tunnel sends a signaling forwarding indication to the MME after receiving the tunnel redirection notification, and the MME forwards received signaling to the IWS corresponding to the original tunnel, thereby preventing interruption of signaling interaction after the tunnel redirection.

Figure 5:
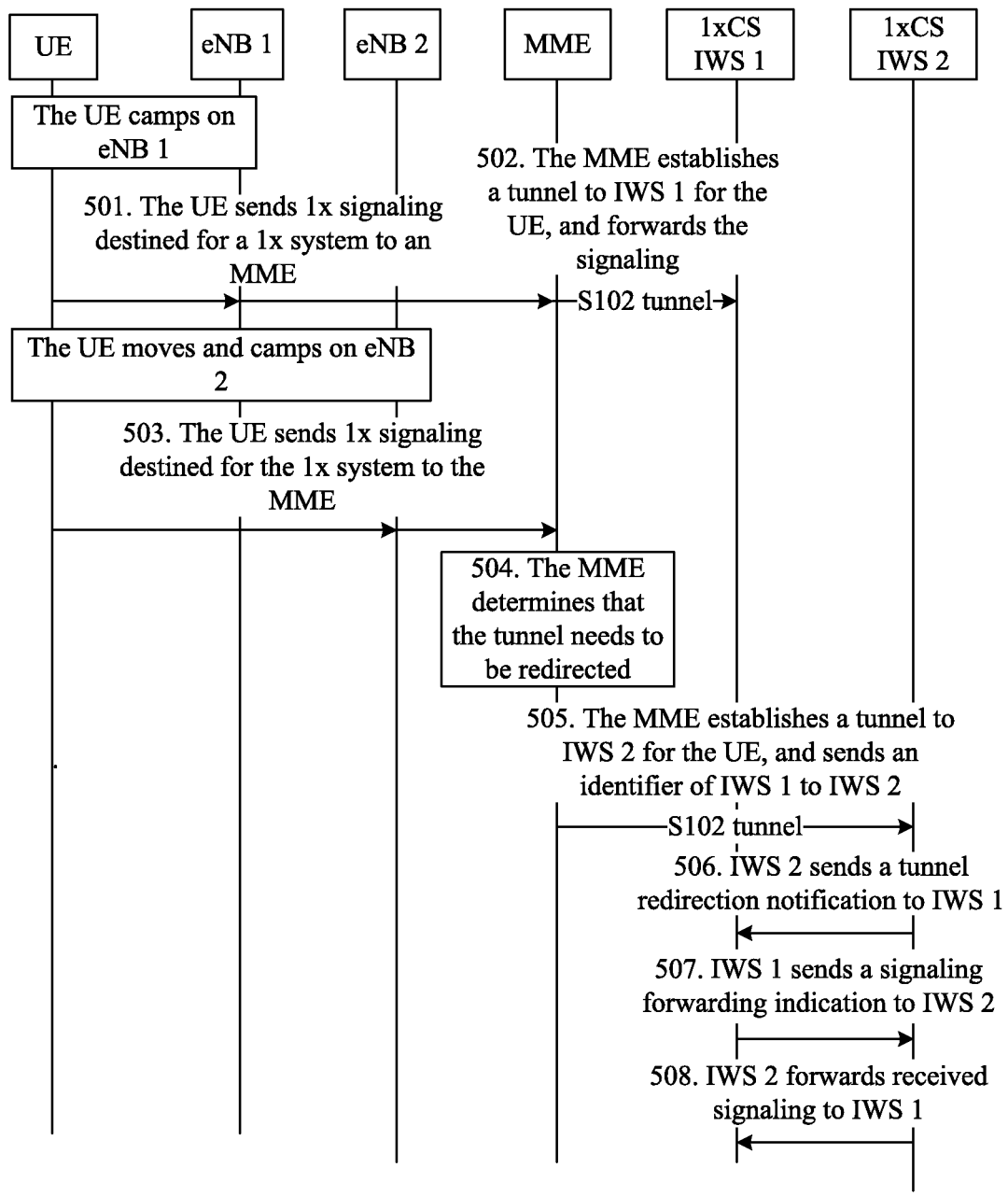
FIG. 5 is a flowchart of a tunnel redirection method according to Embodiment 3 of the present invention.

This third embodiment provides a tunnel redirection method. The tunnel redirection shown in FIG. 3 is still taken as an example herein. The tunnel redirection notification may still be sent by the MME to IWS 1 corresponding to the original tunnel in the way described in Embodiment 2, and the method provided in this embodiment also supports the tunnel redirection notification sent by IWS 2 corresponding to a new tunnel to IWS 1. As shown in FIG. 5, for a scenario in which signaling interaction is still required between IWS 1 and a UE after IWS 1 receives a tunnel redirection notification sent by IWS 2, the process of the method provided in this embodiment can include the following steps.

501: The UE that camps on eNB 1 sends 1× signaling destined for a 1× system to the MME.

502: According to a reference cell identifier configured by eNB 1, the MME establishes an S102 tunnel to IWS 1 for the UE, and forwards the 1× signaling, which is sent by the UE, to IWS 1.

503: After moving and camping on eNB 2, the UE sends 1× signaling destined for the 1× system to the MME.

504: According to the reference cell identifier configured by eNB 2, the MME determines that the tunnel needs to be redirected.

505: The MME establishes a tunnel to IWS 2 for the UE, and sends an identifier of IWS 1 to IWS 2.

For this step, after determining that the tunnel needs to be redirected, the MME establishes an S102 tunnel to IWS 2 for the UE according to a reference cell identifier configured by the eNB 2, and the MME sends the identifier of IWS 1 to IWS 2 in order for IWS 2 to perform signaling interaction with IWS 1, and in order for IWS 2 to notify IWS 1 of tunnel redirection.

506: IWS 2 sends a tunnel redirection notification to IWS 1.

Specifically, after receiving the identifier of IWS 1 from the MME, IWS 2 learns that the MME has redirected the S102 tunnel from IWS 1 to IWS 2, and therefore, IWS 2 may send an indication to IWS 1 to notify IWS 1 of the tunnel redirection. This embodiment does not restrict how IWS 2 sends the tunnel redirection notification to IWS 1. For example, IWS 2 may use a dedicated message to send the tunnel redirection notification, or use a new flag bit added in an existing message to carry the tunnel redirection notification.

507: IWS 1 sends a signaling forwarding indication to IWS 2 after receiving the tunnel redirection notification sent by IWS 2.

For this step, IWS 1 at this time is an entity corresponding to the original tunnel. After receiving the tunnel redirection notification sent by IWS 2 corresponding to the new tunnel, IWS 1 determines that signaling interaction with the UE is still required, and therefore, sends a signaling forwarding indication to IWS 2, that is, forces IWS 2 to forward the signaling, which is sent by the UE, to IWS 1, thereby preventing interruption of signaling interaction. This embodiment does not restrict how IWS 1 sends the signaling forwarding indication to IWS 2. For example, IWS 1 may use a dedicated message to send the signaling forwarding indication, or add a new flag bit in an existing message, therefore using the existing message to send the signaling forwarding indication.

508: IWS 2 forwards received signaling to IWS 1 according to the signaling forwarding indication.

Specifically, because IWS 2 has received the signaling forwarding indication sent by IWS 1, IWS 2 still forwards the 1× signaling, which is sent by the UE, to IWS 1 even if IWS 2 receives the 1× signaling sent by the UE and forwarded by the MME.

This embodiment does not restrict how IWS 2 forwards the signaling. In practical applications, after receiving signaling forwarded by IWS 2, IWS 1 may send a signaling forwarding stop indication to IWS 2 so that IWS 2 stops forwarding. Therefore, IWS 2 forwards the received signaling to IWS 1 according to the signaling forwarding indication until a signaling forwarding stop indication is received from IWS 1, after which the signaling forwarding stops and the received signaling is forwarded to the corresponding MSC.

Alternatively, IWS 2 may forward the received signaling to an entity corresponding to the original tunnel within a preset time period according to the signaling forwarding indication, and, after the preset time period, stop forwarding signaling and send the received signaling to the corresponding MSC. The preset time period may be preset or temporarily negotiated between IWS 1 and IWS 2. This embodiment does not restrict the value of the preset time period.

With the method provided in this embodiment, no matter how IWS 2 is triggered to stop forwarding signaling, in order to save resources, IWS 1 may choose to release resources of the original tunnel after IWS 2 stops forwarding signaling.

With the method provided in the embodiment, after tunnel redirection, an IWS corresponding to a new tunnel sends a tunnel redirection notification to an IWS corresponding to an original tunnel, and therefore, the IWS corresponding to the original tunnel sends a signaling forwarding indication to the IWS corresponding to the new tunnel after receiving the tunnel redirection notification, and the IWS corresponding to the new tunnel forwards received signaling to the IWS corresponding to the original tunnel, thereby preventing interruption of signaling interaction after the tunnel redirection.

Figure 6:
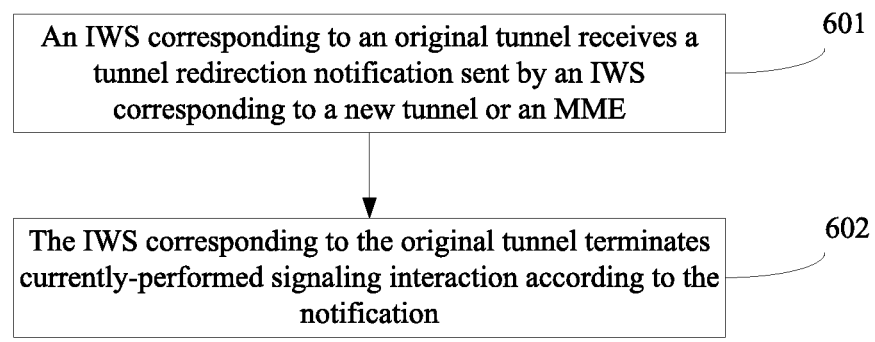
FIG. 6 is a flowchart of a tunnel redirection method according to Embodiment 4 of the present invention.

This fourth embodiment provides a tunnel redirection method. The method deals with how to redirect a tunnel in a scenario in which an IWS corresponding to an original tunnel terminates currently-performed signaling interaction ahead of time after tunnel redirection. Specifically, as shown in FIG. 6, the process of the method is as follows:

601: The IWS corresponding to the original tunnel receives a tunnel redirection notification sent by an IWS corresponding to a new tunnel or an MME.

602: The IWS corresponding to the original tunnel terminates currently-performed signaling interaction according to the notification.

The currently-performed signaling interaction in this embodiment and subsequent embodiments means that the IWS corresponding to the original tunnel is in a communication scene, such as a registration process, a process of receiving or sending a short message, a voice call origination process, a voice call termination process, and so on. This embodiment does not restrict the communication scene of the currently-performed signaling interaction.

Preferably, after terminating currently-performed signaling interaction according to the notification, the method further includes releasing resources of the original tunnel.

Specifically, the receiving, by the IWS corresponding to the original tunnel, a tunnel redirection notification sent by the MME, includes receiving, by the IWS corresponding to the original tunnel, the tunnel redirection notification sent by the MME, where the notification is sent after the MME determines that a tunnel needs to be redirected.

Alternatively, the receiving, by the IWS corresponding to the original tunnel, a tunnel redirection notification sent by the IWS corresponding to the new tunnel, includes receiving, by the IWS corresponding to the original tunnel, the tunnel redirection notification that is sent, according to an identifier of the IWS corresponding to the original tunnel, by the IWS corresponding to the new tunnel, where the identifier of the IWS corresponding to the original tunnel is sent by the MME to the IWS corresponding to the new tunnel after the MME determines that a tunnel needs to be redirected.

With the method provided in the embodiment, after tunnel redirection, an IWS corresponding to a new tunnel or an MME sends a tunnel redirection notification to an IWS corresponding to an original tunnel, and therefore, the IWS corresponding to the original tunnel terminates currently-performed signaling interaction, thereby avoiding resource waste after tunnel redirection effectively.

Figure 7:
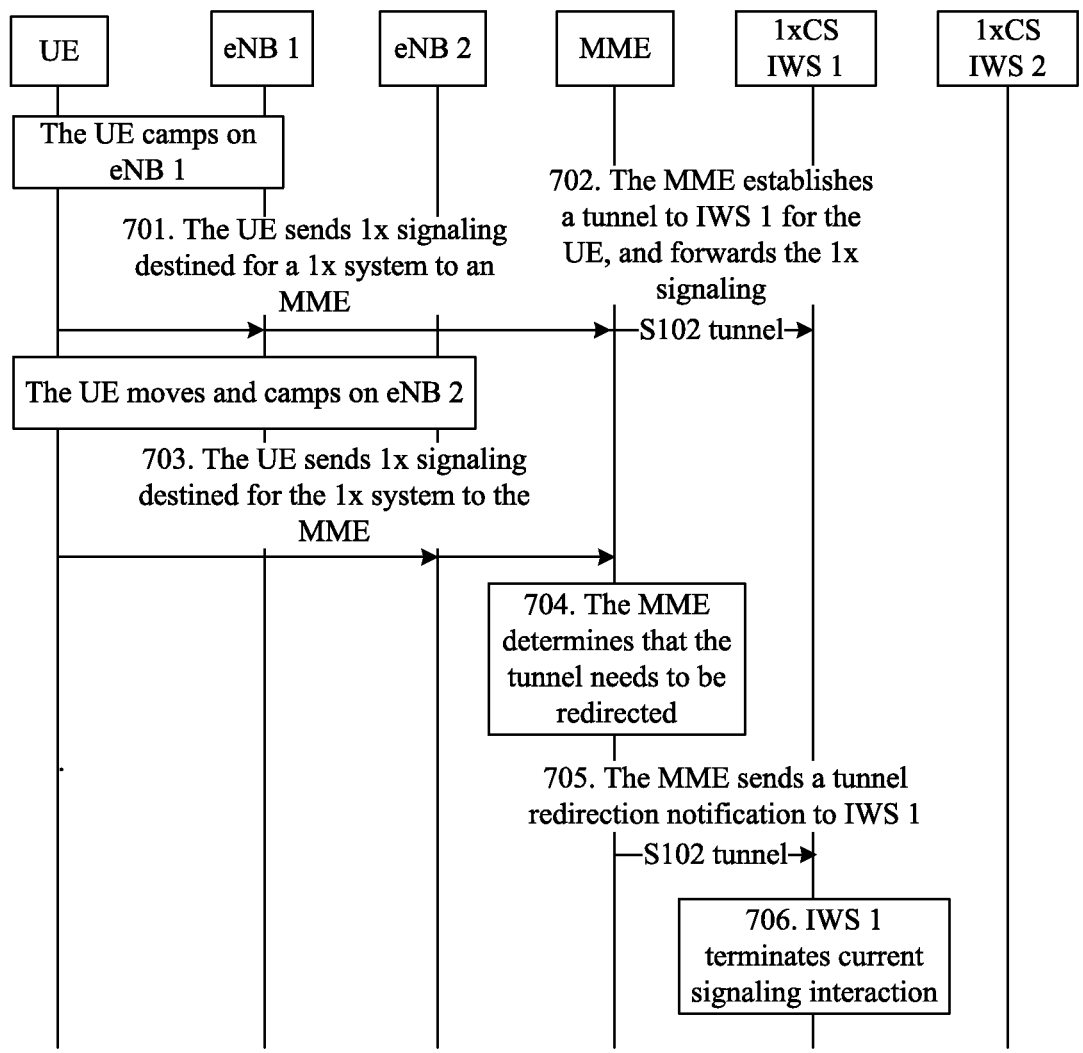
FIG. 7 is a flowchart of a tunnel redirection method according to Embodiment 5 of the present invention.

This fifth embodiment provides a tunnel redirection method. Still taking the schematic diagram of redirection in FIG. 3 as an example, to avoid resource waste after tunnel redirection, when an MME finds that a destination IWS of forwarded 1× signaling of a UE is different from a destination IWS of 1× signaling forwarded previously, the MME notifies the destination IWS that previously forwards the 1× signaling that the MME will forward uplink 1× signaling of the UE to another IWS. Specifically, as shown in FIG. 7, the process of the method provided in this embodiment is as follows:

701: The UE that camps on eNB 1 sends 1× signaling destined for a 1× system to the MME.

A Reference Cell ID 1 parameter is configured by eNB 1, and is mapped to IWS 1 in the MME.

702: According to a reference cell identifier configured by eNB 1, the MME establishes an S102 tunnel to IWS 1 for the UE, and forwards the 1× signaling, which is sent by the UE, to IWS 1.

703: After moving and camping on eNB 2, the UE sends 1× signaling destined for the 1× system to the MME.

A Reference Cell ID 2 parameter is configured by eNB 2, and is mapped to IWS 2 in the MME.

704: According to the reference cell identifier configured by eNB 2, the MME determines that the tunnel needs to be redirected.

For this step, each 1× signaling sent by the UE is sent to the MME through the corresponding eNB. To differentiate the 1× signaling sent by different UEs, a corresponding UE identifier is carried in each message. Therefore, after the MME receives the 1× signaling sent by the same UE served by eNB 2, because the Reference Cell ID 2 parameter configured by eNB 2 is mapped in the MME to IWS 2 that is different from the destination IWS 1 of the previous forwarding, the MME can determine the need of redirection of the tunnel of the UE according to the reference cell identifier configured by eNB 2.

705: The MME sends a tunnel redirection notification to IWS 1.

Specifically, after the MME determines that a tunnel needs to be redirected, the MME may use a dedicated message to send an S102 tunnel redirection notification to IWS 1 corresponding to the original tunnel, or use a new flag bit added in an existing message to carry the S102 tunnel redirection notification. This embodiment does not restrict how the MME sends the tunnel redirection notification to IWS 1.

706: IWS 1 terminates the currently-performed signaling interaction according to the tunnel redirection notification.

For this step, the currently-performed signaling interaction of IWS 1 includes but is not limited to possible signaling interaction with the UE and/or signaling interaction with an MSC. After receiving the S102 tunnel redirection notification sent by the MME, IWS 1 corresponding to the original tunnel learns that the MME will forward the 1× signaling of the UE to another IWS. Therefore, if IWS 1 is currently performing signaling interaction with the MSC, IWS 1 may choose to terminate the signaling interaction with the MSC ahead of time; if IWS 1 is currently performing signaling interaction with the UE, IWS 1 may choose to terminate the signaling interaction with the UE ahead of time; if IWS 1 is currently performing signaling interaction with both the UE and the MSC, IWS 1 may simultaneously terminate possible signaling interaction with the UE and the signaling interaction with the MSC to avoid resource waste caused by failure of stopping the signaling interaction.

Preferably, to further save resources, after the currently-performed signaling interaction stops, IWS 1 may release resources of the original tunnel after terminating the currently-performed signaling interaction.

IWS 1 may terminate the signaling process ahead of time by sending a Release Order message to the UE, or sending a Clear request message to the MSC, and the like. This embodiment does not restrict how the signaling process is terminated, and does not restrict when IWS 1 releases tunnel resources.

Alternatively, before or after terminating the currently-performed signaling interaction process ahead of time, IWS 1 may send a signaling non-forwarding indication to the MME, and therefore, the MME does not need to forward the signaling, which is sent by the UE, to IWS 1 any more, but directly sends the received signaling to IWS 2 corresponding to the new tunnel, and all 1× signaling related to the UE will be transmitted through the new tunnel subsequently.

With the method provided in the embodiment, after tunnel redirection, an MME sends a tunnel redirection notification to an IWS corresponding to an original tunnel, and therefore, the IWS corresponding to the original tunnel terminates currently-performed signaling interaction, and may further choose to release resources of the original tunnel, thereby avoiding resource waste after tunnel redirection effectively.

Figure 8:
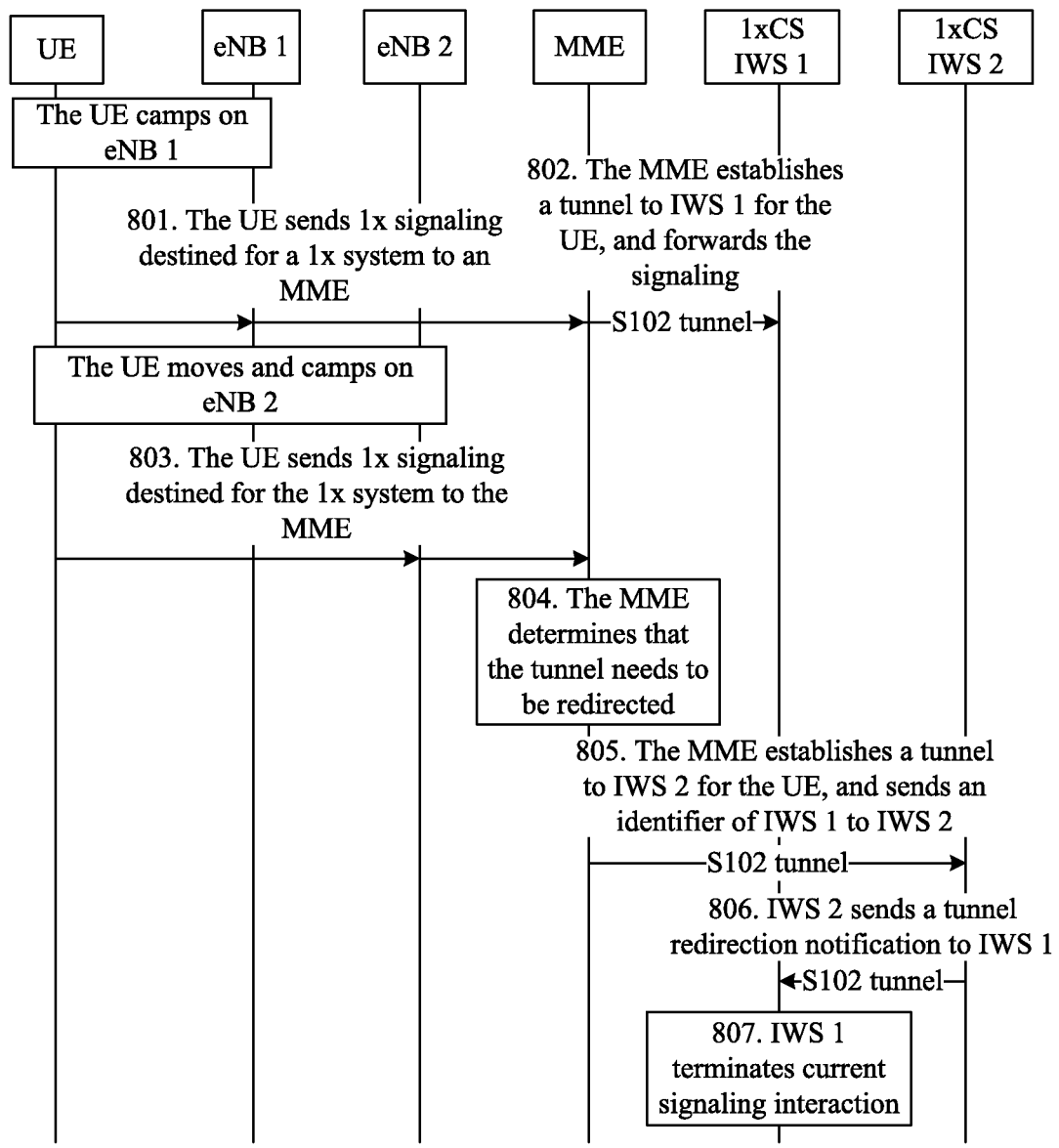
FIG. 8 is a flowchart of a tunnel redirection method according to Embodiment 6 of the present invention.

This sixth embodiment provides a tunnel redirection method. The tunnel redirection shown in FIG. 3 is still taken as an example herein. The tunnel redirection notification may still be sent by the MME to IWS 1 corresponding to the original tunnel in the way described in Embodiment 5, and the method provided in this embodiment also supports the tunnel redirection notification sent by IWS 2 corresponding to a new tunnel to IWS 1. Specifically, as shown in FIG. 8, the process of the method provided in this embodiment is as follows:

801: The UE that camps on eNB 1 sends 1× signaling destined for a 1× system to the MME.

802: According to a reference cell identifier configured by eNB 1, the MME establishes an S102 tunnel to IWS 1 for the UE, and forwards the 1× signaling, which is sent by the UE, to IWS 1.

803: After moving and camping on eNB 2, the UE sends 1× signaling destined for the 1× system to the MME.

804: According to the reference cell identifier configured by eNB 2, the MME determines that the tunnel needs to be redirected.

Steps 801 to 804 are the same as the description about steps 701 to 704 in Embodiment 5. The method provided in this embodiment differs from Embodiment 5 in that: after the MME determines that a tunnel needs to be redirected, IWS 2 corresponding to the new tunnel rather than the MME notifies IWS 1 of tunnel redirection. For details, reference may be made to subsequent steps.

805: The MME establishes a tunnel to IWS 2 for the UE, and sends an identifier of IWS 1 to IWS 2.

For this step, after determining that the tunnel needs to be redirected, the MME establishes an S102 tunnel to IWS 2 for the UE according to a reference cell identifier configured by the eNB 2, and the MME sends the identifier of IWS 1 to IWS 2 in order for IWS 2 to perform signaling interaction with IWS 1, and in order for IWS 2 to notify IWS 1 of tunnel redirection.

806: IWS 2 sends a tunnel redirection notification to IWS 1.

Specifically, after receiving the identifier of IWS 1 from the MME, IWS 2 learns that the MME has redirected the S102 tunnel from IWS 1 to IWS 2, and therefore, IWS 2 may send an indication to IWS 1 to notify IWS 1 of the tunnel redirection. This embodiment does not restrict how IWS 2 sends the tunnel redirection notification to IWS 1. For example, IWS 2 may use a dedicated message to send the tunnel redirection notification, or use a new flag bit added in an existing message to carry the tunnel redirection notification.

807: IWS 1 terminates the currently-performed signaling interaction after receiving the tunnel redirection notification sent by IWS 2.

The currently-performed signaling interaction of IWS 1 includes but is not limited to signaling interaction with the UE and/or signaling interaction with an MSC.

For this step, after receiving the tunnel redirection notification sent by IWS 2, if IWS 1 is currently performing signaling interaction with the UE, IWS 1 may choose to terminate the signaling interaction with the UE ahead of time; if IWS 1 is currently performing signaling interaction with the MSC, IWS 1 may choose to terminate the signaling interaction with the MSC ahead of time; if IWS 1 is currently performing signaling interaction with both the UE and the MSC, IWS 1 may simultaneously terminate possible signaling interaction with the UE and the signaling interaction with the MSC. The signaling interaction process may be terminated ahead of time by sending a Release Order message to the UE, or sending a Clear request message to the MSC, and the like. This embodiment does not restrict how and when IWS 1 terminates the signaling interaction.

Preferably, to further save resources, IWS 1 may release resources of the original tunnel after terminating the currently-performed signaling interaction.

Alternatively, before or after terminating the currently-performed signaling interaction process ahead of time, IWS 1 may send a signaling non-forwarding indication to IWS 2, and therefore, IWS 2 does not need to forward the signaling, which is sent by the UE, to IWS 1 any more, but directly sends the received signaling to the corresponding MSC.

With the method provided in the embodiment, after tunnel redirection, an IWS corresponding to a new tunnel sends a tunnel redirection notification to an IWS corresponding to an original tunnel, and therefore, the IWS corresponding to the original tunnel terminates currently-performed signaling interaction, and further chooses to release resources of the original tunnel, thereby avoiding resource waste after tunnel redirection effectively.

Figure 9:
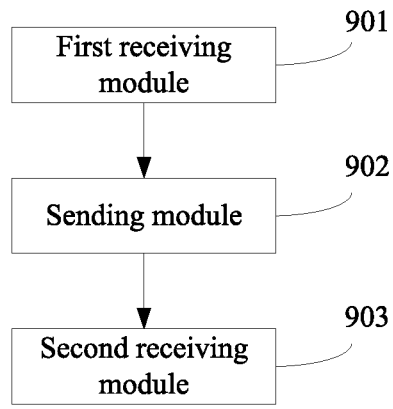
FIG. 9 is a schematic structural diagram of an interworking function entity according to Embodiment 7 of the present invention.

This seventh embodiment provides an interworking function entity. As shown in FIG. 9, the entity includes a first receiving module 901, configured to receive a tunnel redirection notification sent by an MME or an interworking function entity IWS corresponding to a new tunnel, a sending module 902, configured to send a signaling forwarding indication to the IWS corresponding to the new tunnel or the MME according to the notification received by the first receiving module 901, and a second receiving module 903, configured to receive signaling forwarded by the IWS corresponding to the new tunnel or the MME according to the signaling forwarding indication sent by the sending module 902.

The second receiving module 903 is specifically configured to receive the signaling forwarded by the IWS corresponding to the new tunnel or the MME until a signaling forwarding stop indication is returned to the IWS corresponding to the new tunnel or the MME, where the indication instructs the IWS corresponding to the new tunnel or the MME to stop forwarding signaling.

Alternatively, the second receiving module 903 is specifically configured to receive the signaling forwarded by the IWS corresponding to the new tunnel or the MME within a preset time period.

The preset time period is preset or temporarily negotiated between the IWS provided in this embodiment and the IWS corresponding to the new tunnel or the MME.

Figure 10:
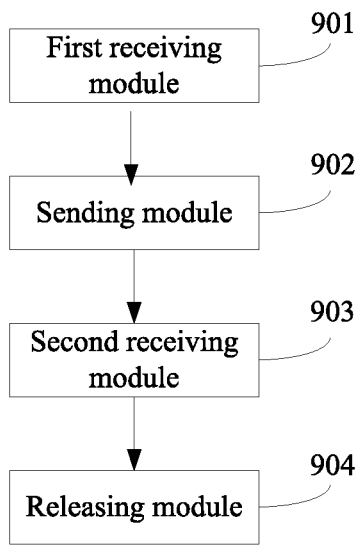
FIG. 10 is a schematic structural diagram of another interworking function entity according to Embodiment 7 of the present invention.

As shown in FIG. 10, the entity further includes a releasing module 904, configured to release resources of the original tunnel after the currently-performed signaling interaction is terminated.

With the entity provided in this embodiment, after tunnel redirection, a tunnel redirection notification is received from an MME or an entity corresponding to a new tunnel, and a signaling forwarding indication is sent to the MME or the entity corresponding to the new tunnel according to the tunnel redirection notification, and therefore, the IWS corresponding to the new tunnel or the MME forwards received signaling to the entity, thereby preventing interruption of signaling interaction after the tunnel redirection.

Figure 11:
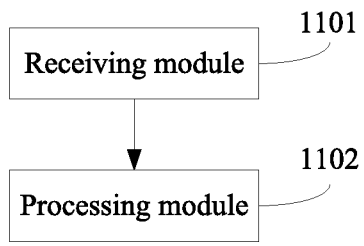
FIG. 11 is a schematic structural diagram of an interworking function entity according to Embodiment 8 of the present invention.

This eighth embodiment provides an interworking function entity. As shown in FIG. 11, the entity includes a receiving module 1101, configured to receive a tunnel redirection notification sent by an IWS corresponding to a new tunnel or an MME, and a processing module 1102, configured to terminate currently-performed signaling interaction according to the notification received by the receiving module 1101.

Figure 12:
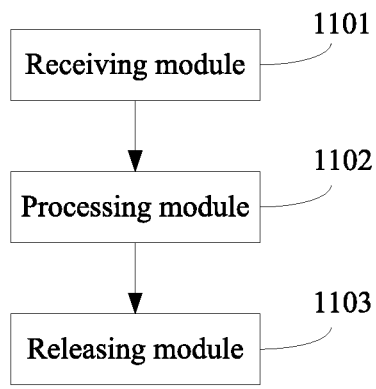
FIG. 12 is a schematic structural diagram of another interworking function entity according to Embodiment 8 of the present invention.

Preferably, as shown in FIG. 12, the entity further includes a releasing module 1103, configured to release resources of the original tunnel after the processing module 1102 terminates the currently-performed signaling interaction.

With the entity provided in the embodiment, after a tunnel redirection notification is received from an IWS corresponding to a new tunnel or an MME, currently-performed signaling interaction is terminated, and further, resources of the original tunnel may be released, thereby avoiding resource waste after tunnel redirection effectively.

It should be noted that when the interworking function entity provided in the foregoing embodiment undergoes tunnel redirection, the foregoing division of the function modules is exemplary only. In practical applications, the foregoing functions may be undertaken by different function modules as required, that is, the internal structure of the entity is divided into different function modules to implement all or part of the functions described above. In addition, the interworking function entity provided in the foregoing embodiment and the tunnel redirection method embodiment are based on the same conception. For the detailed implementation process of the entity, reference may be made to the method embodiment.

The sequence number of an embodiment of the present invention is for ease of description only, and does not represent priority of the embodiment. All or part of the steps in an embodiment of the present invention may be implemented by hardware, or by relevant hardware instructed by a program. The program may be stored in a readable storage medium such as an optical disk, a hard disk, and so on.

The foregoing descriptions are merely exemplary embodiments of the present invention, but are not intended to limit the present invention. Any modifications, equivalent substitutions, and improvements made within the spirit and principle of the present invention shall fall within the protection scope of the present invention.

What is claimed is:

1. A tunnel redirection method, comprising:
   receiving, by an Interworking Solution (IWS) corresponding to an original tunnel, a tunnel redirection notification sent by an IWS corresponding to a new tunnel, the tunnel redirection notification indicating that a user equipment (UE) is being redirected from the original tunnel to the new tunnel;
   sending, by the IWS corresponding to the original tunnel, a signaling forwarding indication to the IWS corresponding to the new tunnel according to the notification; and
   receiving, by the IWS corresponding to the original tunnel, signaling forwarded by the IWS corresponding to the new tunnel according to the signaling forwarding indication,
   wherein receiving the tunnel redirection notification comprises receiving the tunnel redirection notification that is sent, according to an identifier of the IWS corresponding to the original tunnel, by the IWS corresponding to the new tunnel, wherein the identifier of the IWS corresponding to the original tunnel is sent by a mobility management entity (MME) to the IWS corresponding to the new tunnel after the MME determines that a tunnel needs to be redirected.

2. The method according to claim 1, wherein receiving the signaling forwarded by the IWS corresponding to the new tunnel comprises:
   receiving, by the IWS corresponding to the original tunnel, the signaling forwarded by the IWS corresponding to the new tunnel until a signaling forwarding stop indication is returned to the IWS corresponding to the new tunnel, wherein the indication instructs the IWS corresponding to the new tunnel to stop forwarding signaling.

3. The method according to claim 2, further comprising releasing, by the IWS corresponding to the original tunnel, resources of the original tunnel after the IWS corresponding to the new tunnel stops forwarding signaling.

4. The method according to claim 1, wherein receiving the signaling forwarded by the IWS corresponding to the new tunnel comprises:
   receiving, by the IWS corresponding to the original tunnel, the signaling forwarded by the IWS corresponding to the new tunnel within a preset time period, whereupon the IWS corresponding to the new tunnel stops forwarding signaling after the preset time period.

5. The method according to claim 4, wherein the preset time period is preset or temporarily negotiated between the IWS corresponding to the original tunnel and the IWS corresponding to the new tunnel.

6. An interworking solution (IWS) function entity corresponding to an original tunnel, comprising:
   a processor; and a computer readable storage medium storing programming for execution by the processor, the programming including instructions to:

receive a tunnel redirection notification sent by an Interworking Solution (IWS) corresponding to a new tunnel, the tunnel redirection notification indicating that a user equipment (UE) is being redirected from the original tunnel to the new tunnel;

send a signaling forwarding indication to the IWS corresponding to the new tunnel according to the tunnel redirection notification; and receive signaling forwarded by the IWS corresponding to the new tunnel according to the signaling forwarding indication, wherein the instructions to receive the tunnel redirection notification includes instructions to receive the tunnel redirection notification that is sent, according to an identifier of the IWS corresponding to the original tunnel, by the IWS corresponding to the new tunnel, wherein the identifier of the IWS corresponding to the original tunnel is sent by a mobility management entity (MME) to the IWS corresponding to the new tunnel after the MME determines that a tunnel needs to be redirected.

7. The IWS function entity according to claim 6, wherein the programming further includes instructions to receive the signaling forwarded by the IWS corresponding to the new tunnel until a signaling forwarding stop indication is returned to the IWS corresponding to the new tunnel, wherein the indication instructs the IWS corresponding to the new tunnel to stop forwarding signaling.

8. The IWS function entity according to claim 6, wherein the signaling forwarded by the IWS corresponding to the new tunnel is received within a preset time period.

9. The IWS function entity according to claim 6, wherein the programming further includes instructions to release resources of the original tunnel after the signaling interaction is terminated.

10. A tunnel redirection method, comprising:

receiving, by an Interworking Solution (IWS) function entity corresponding to an original tunnel, a tunnel redirection notification sent by an IWS corresponding to a new tunnel, the tunnel redirection notification indicating that a user equipment (UE) is being redirected from the original tunnel to the new tunnel; and terminating, by the IWS corresponding to the original tunnel, a signaling interaction according to the notification, wherein receiving the tunnel redirection notification sent by an IWS corresponding to the new tunnel comprises receiving, by the IWS corresponding to the original tunnel, the tunnel redirection notification that is sent, according to an identifier of the IWS corresponding to the original tunnel, by the IWS corresponding to the new tunnel, wherein the identifier of the IWS corresponding to the original tunnel is sent by a mobility management entity (MME) to the IWS corresponding to the new tunnel after the MME determines that a tunnel needs to be redirected.

11. The method according to claim 10, wherein, after terminating the signaling interaction, the method further comprises releasing, by the IWS corresponding to the original tunnel, resources of the original tunnel.

12. An interworking solution (IWS) function entity corresponding to an original tunnel, comprising:

a processor; and a computer readable storage medium storing programming for execution by the processor, the programming including instructions to:

receive a tunnel redirection notification sent by an Interworking Solution (IWS) function entity corresponding to a new tunnel, the tunnel redirection notification indicating that a user equipment (UE) is being redirected from the original tunnel to the new tunnel; and terminate signaling interaction according to the notification received by the receiving module, wherein the instructions to receive the tunnel redirection notification sent by an IWS corresponding to the new tunnel includes instructions to receive the tunnel redirection notification that is sent, according to an identifier of the IWS corresponding to the original tunnel, by the IWS corresponding to the new tunnel, wherein the identifier of the IWS corresponding to the original tunnel is sent by a mobility management entity (MME) to the IWS corresponding to the new tunnel after the MME determines that a tunnel needs to be redirected.

13. The IWS function entity according to claim 12, wherein the programming further includes instructions to release resources of the original tunnel after the processing module terminates the signaling interaction.

* * * * *